R. E. ADREON.
AUTOMOBILE STEERING WHEEL LOCK.
APPLICATION FILED NOV. 5, 1917.

1,270,088.

Patented June 18, 1918.

Inventor
Robert E. Adreon

UNITED STATES PATENT OFFICE.

ROBERT E. ADREON, OF ST. LOUIS, MISSOURI.

AUTOMOBILE-STEERING-WHEEL LOCK.

1,270,088.  Specification of Letters Patent.  Patented June 18, 1918.

Application filed November 5, 1917. Serial No. 200,312.

*To all whom it may concern:*

Be it known that I, ROBERT E. ADREON, a citizen of the United States, residing at St. Louis, Missouri, have invented a certain new and useful Improvement in Automobile-Steering-Wheel Locks, of which the following is a full, clear, and exact description, such as will enable others skilled in the art to which it appertains to make and use the same, reference being had to the accompanying drawings, forming part of this specification.

My invention relates to a locking device for the steering wheels of automobiles, the principal object of my invention being to provide relatively simple locking means which is arranged on the tubular post or column which surrounds the steering shaft and said means including parts which are adapted to engage a part of the steering wheel so as to prevent the same from being turned in either direction and consequently preventing the theft or unauthorized use of the vehicle.

A further object of my invention is the production of a locking device of the character referrred to which is of comparatively few parts and simple in construction, and thereby comparatively inexpensive in cost of production and a lock which will effectively perform the purpose for which it is designed.

A still further object of my invention is to construct the parts of the lock so that when the wheel engaging members are in locking position, it will be practically impossible with ordinary implements to remove the lock from the steering column.

With the foregoing and other objects in view, my invention consists in certain novel features of construction and arrangement of parts, hereinafter more fully described and claimed, and illustrated in the accompanying drawings, in which—

Figures 1, 2:
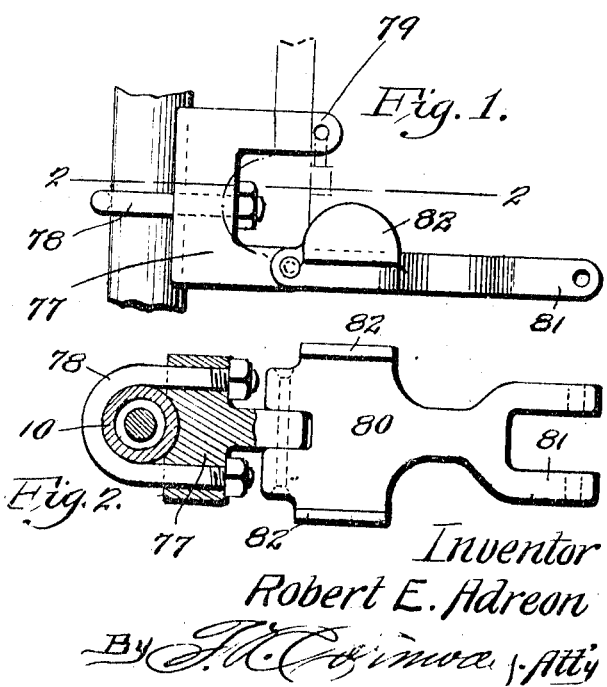
Figure 1 is a side elevational view of a locking device of my improved construction, the same being applied to a steering post.
Fig. 2 is a horizontal section taken approximately on the line 2—2 of Fig. 1.

Referring by numerals to the accompanying drawings, a block 77 is secured to the steering column by means of a U-bolt 78, the latter having nuts applied to its ends and formed integral with the upper portion of this block 77 is a pair of outwardly projecting ears 79, the same being horizontally perforated in order to receive the shackle of a padlock or similar locking device.

Hinged to the lower portion of the block is a plate 80 provided with a bifurcated extension 81 which, when the plate is swung upward, is adapted to engage one of the spokes of the steering wheel and hold the same against rotation. Formed integral with the sides of plate 80 are ears 82 which, when said plate is swung upward into a vertical position, overlie the nuts on the ends of U-bolt 78, thus preventing said nuts from being removed when the device is in locking position.

When plate 80 is swung upward, a portion of it will lie between the ears 79 and thus said plate is maintained in a firm and substantial manner while in locking position.

A locking device of my improved construction is comparatively simple, is applicable for use upon all vehicles which are steered by means of a hand wheel and when the wheel engaging parts of the device are in locking position, the means utilized for securing the device to the steering column is protected in such manner as to make it practically impossible for an unauthorized person to remove the lock with ordinary implements. Further, my improved construction is instrumental in permitting each car owner or driver to utilize a padlock of his own selection, and in this connection it will be understood that there is a wide variety of padlocks, and for such reason, the opening of a padlock by use of a duplicate key is reduced to a minimum.

It will be readily understood that minor changes in the size, form and construction of the various parts of my improved locking device can be made and substituted for those herein shown and described, without departing from the spirit of my invention, the scope of which is set forth in the appended claim.

I claim:

The combination with an autmobile steering column and the steering wheel associated therewith, of a block adapted to be positioned on the steering column adjacent to the steering wheel, a U-bolt adapted to coöperate with said block to grip the steering column, the legs of which U-bolt pass through said block, nuts on the ends of the legs of said U-bolt, a steering wheel engaging arm hinged to the lower end of said block, the free end of said arm being bifurcated and adapted to engage one of the spokes of the steering wheel when swung upwardly into a position substantially parallel with the steering column, ears projecting from the sides of said arm, which ears are adapted to overlie the nuts on the ends of the U-bolt when the arm occupies a wheel engaging position, ears on the upper end of the block, which ears are adapted to be engaged by the arm while in wheel engaging position, and the perforations in said ears being adapted to receive the shackle of a padlock or like locking device.

In testimony whereof I hereunto affix my signature in the presence of two witnesses, this 3d day of November, 1917.

ROBERT E. ADREON.

Witnesses:
 LAURA MEYER,
 M. P. SMITH.